A. S. INGMAN.
INDICATOR.
APPLICATION FILED FEB. 28, 1912.
1,050,078.
Patented Jan. 7, 1913.
4 SHEETS—SHEET 1.
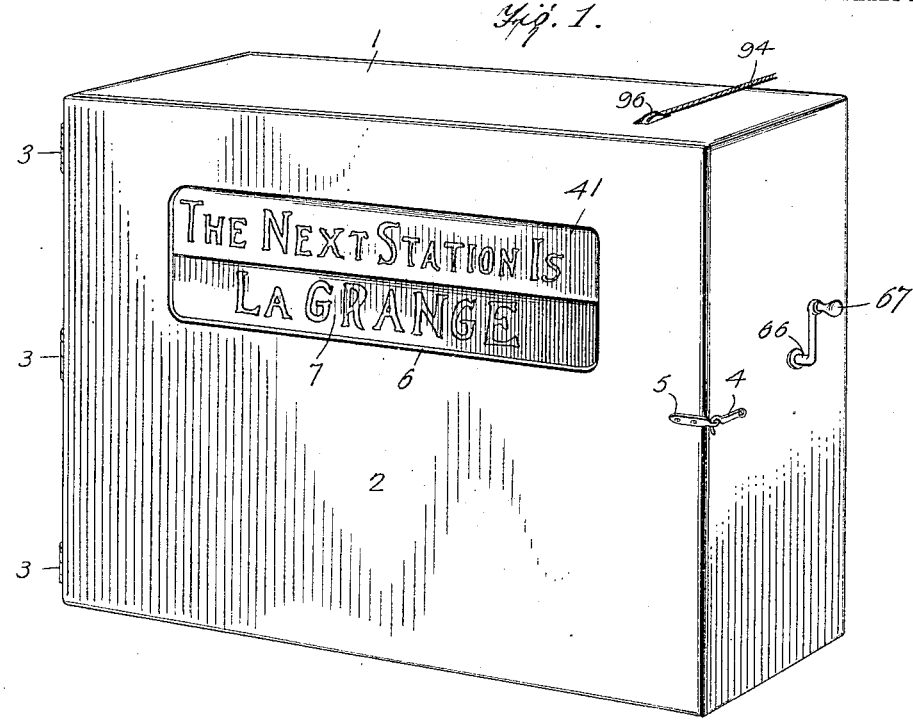
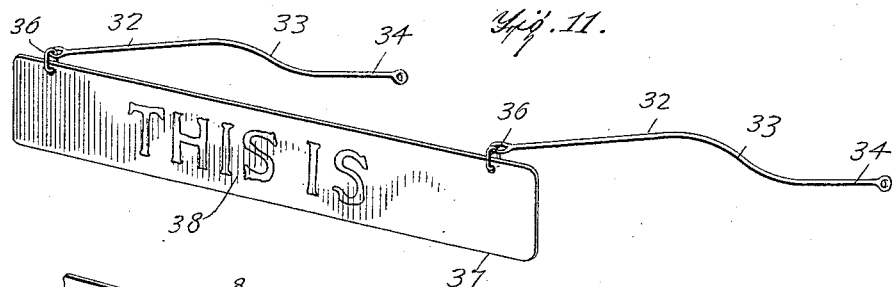
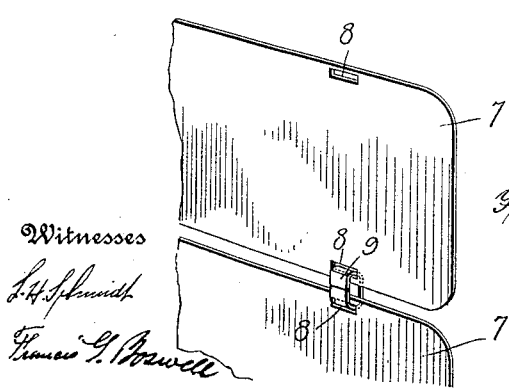

A. S. INGMAN.
INDICATOR.
APPLICATION FILED FEB. 28, 1912.
1,050,078.
Patented Jan. 7, 1913.
4 SHEETS—SHEET 2.
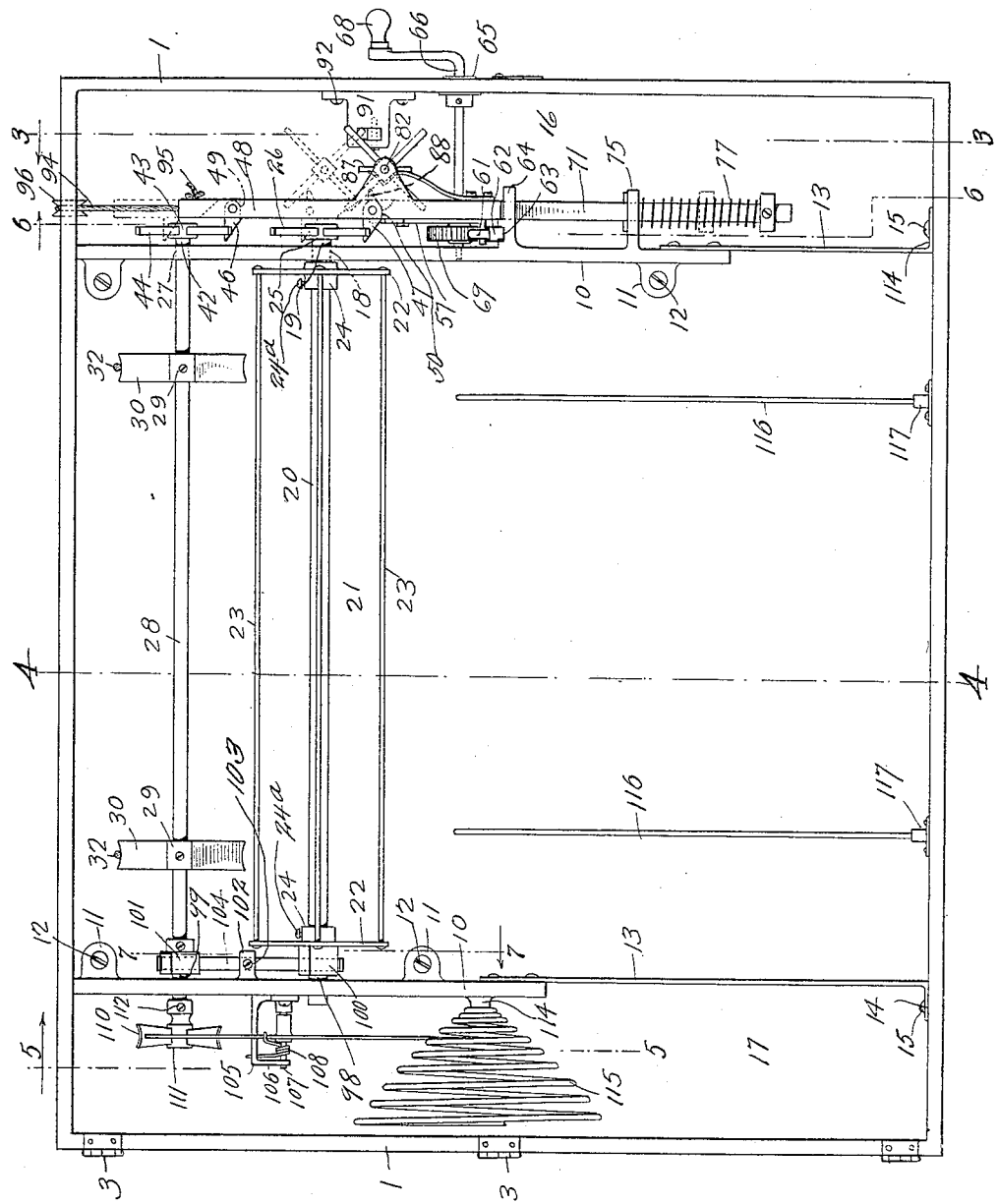
Witnesses
L. H. Schmidt.
Francis G. Boswell.
Inventor
A. S. Ingman
By D. Swift & Co
Attorneys A. S. INGMAN.
INDICATOR.
APPLICATION FILED FEB. 28, 1912.
1,050,078.
Patented Jan. 7, 1913.
4 SHEETS—SHEET 3.
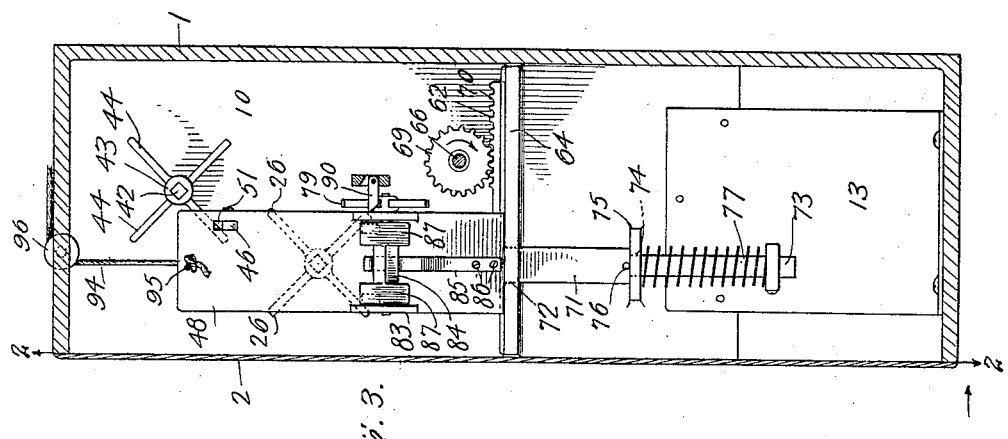
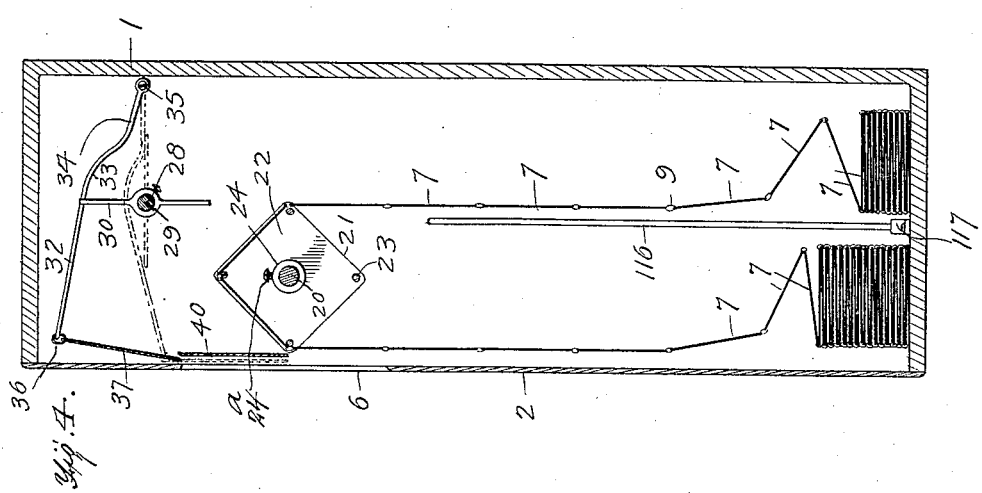
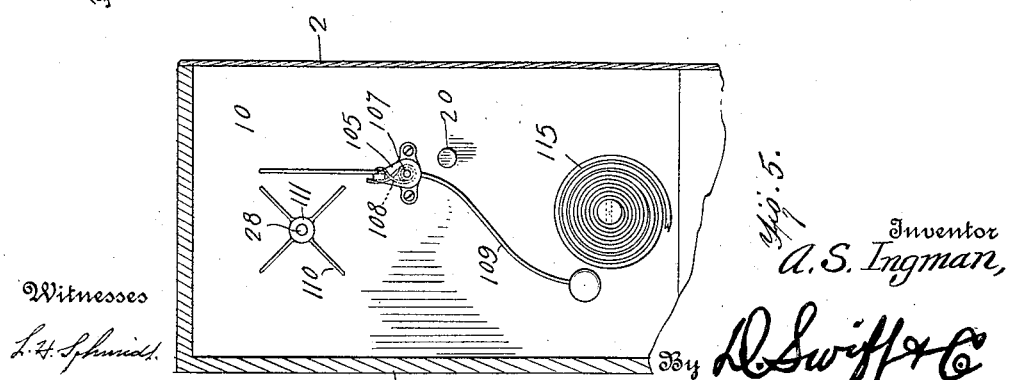
Witnesses
L. H. Schmidt
Frances G. Boswell
Inventor
A. S. Ingman,
By D. Swift & Co.
Attorneys

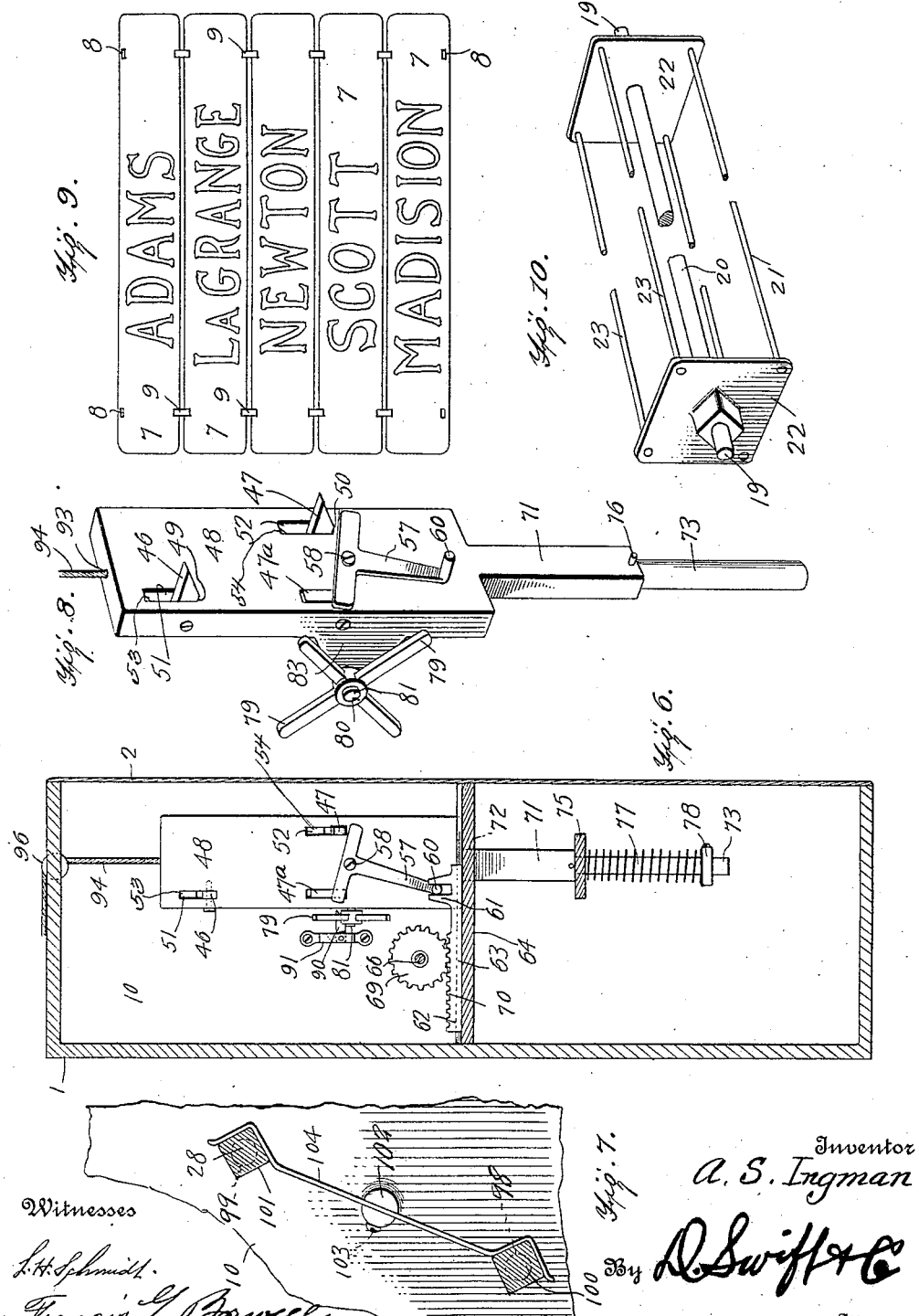

UNITED STATES PATENT OFFICE.

ABNER SMITH INGMAN, OF LA GRANGE, MISSOURI.

INDICATOR.

1,050,078.  Specification of Letters Patent.  Patented Jan. 7, 1913.

Application filed February 28, 1912. Serial No. 680,451.

*To all whom it may concern:*

Be it known that I, ABNER SMITH INGMAN, a citizen of the United States, residing at La Grange, in the county of Lewis and State of Missouri, have invented a new and useful Indicator; and I do hereby declare the following to be a full, clear, and exact description of the invention, such as will enable others skilled in the art to which it appertains to make and use the same.

This invention belongs to the art of indicators, and more especially to a place indicator which in addition may be used as an advertising device, whereby ads. and the like may be displayed.

It is the aim of the invention to devise a device of this nature adapted for use upon all conveyances, to indicate the approach to and the arrival at each place on a route. This indicator may display ads. which may be arranged between the various stations or other places.

When a conveyance is provided with more than one indicator, for instance two of them, one may be used for indicating the approach to and arrival at a station, while the other may indicate the approach to and the arrival at the various business houses and similar places along the route, not only business houses but places of interest, such as public buildings and the like.

It is to be understood that the indicator may be operated by the motorman or conductor, or provided with any suitable means, whereby the conductor or motorman may easily and quickly operate the same. Furthermore, it is to be understood that the indicator may be placed in any part of the conveyance.

A further object of the invention is the provision of an improved device of this nature in which novel, efficient, practical and desirable features of construction are involved.

These features are hereinafter set forth, shown and claimed.

In the drawings, Figure 1 is a view in perspective of the place or station indicator, constructed in accordance with the invention. Fig. 2 is a sectional view on line 2—2 of Fig. 3. Fig. 3 is a sectional view on line 3—3 of Fig. 2. Fig. 4 is a transverse sectional view on line 4—4 of Fig. 3. Fig. 5 is a sectional view on line 5—5 of Fig. 3. Fig. 6 is a sectional view on line 6—6 of Fig. 3. Fig. 7 is a detail view in section on line 7—7 of Fig. 3 showing the means for holding the skeleton reel in place. Fig. 8 is a detail perspective view of the drawbar, which is adapted to be actuated to coordinately operate the various parts of the indicator. Fig. 9 is a detail view of one or more of the plurality of slats, on which the station, landing or other place is printed, showing how they are connected in sequence. Figs. 10 and 11 are detail views. Fig. 12 is a detail perspective view showing two of the slats 7.

Referring to the drawings, 1 designates the casing, which may be constructed of any suitable material, in the present instance of wood or the like. However, the front of the casing is provided with a metal door or closure 2, hinged at 3, and provided with a latch and loop 4 and 5, for holding the door closed. The door 2 is formed with an elongated opening 6, through which the words "The next station is", and the name of the station appear, or "This is", and the name of the station appear. Instead of the name of the station, business houses, theaters and places of interest or the like may be printed on the plurality of slats 7. Between the printed names of business houses and the like or the names of the stations, advertising matter or other printed matter or the like may be displayed. The slats adjacent their longitudinal edges are formed with short slots 8, through which metal straps or bands 9 are passed, for connecting a plurality of slats in sequence. Each slat may have printed matter upon each of its sides, so that the chain of slats may be reversed so as to display different matter through the opening 6.

In the casing 1 adjacent each end, division plates 10 are arranged, the same being fastened in position by the lugs 11 and the screws 12. The lower ends of the plates 10 are braced relatively to the casing 1 by the bars 13, the feet 14 of which are secured to the bottom of the casing 1 by the screws 15, while the upper ends of the bars are connected by screws to the division plates. These division plates divide each end of the casing into a smaller compartment, one being designated by the numeral 16, while the other is designated by the numeral 17.

Mounted in suitable bearings 18 of the division plates 10 are the pintles 19 of the shaft 20, which shaft constitutes the core of the skeleton reel or roller 21. This skeleton reel or roller comprises the rectangular end plates 22, which are connected by the four rods 23. When the reel or roller is at rest, thereby displaying one of the slats of the plurality through the elongated opening 6, two of the diagonally opposite rods are arranged in a vertical plane, as clearly shown in the transverse sectional view of Fig. 2. The plates 22 are provided with collars 24, through which set screws or the like 24$^a$ penetrate, for holding the plates to the shaft 20. On one of the pintles of the shaft 20 is a disk 25, having four radial arms 26, which, when the reel or roller is at rest, extend upon forty-five degree angles. This collar 25 is secured upon the pintle by friction, or by any other suitable means. The purpose of this collar 25 and arm 26 will be hereinafter set forth. Also mounted in suitable bearings 27 of the division plates and disposed above and slightly offset to the rear of the shaft 20, is a rod 28, upon which and equally spaced apart are collars 29 having upon each two radial arms 30, which extend in opposite directions. The arms 30, when in vertical positions, as shown in Fig. 2, support the rods 32, which are formed with a slight curve 33, the extensions 34 of which are connected at 35 to the casing. Pivoted to the free ends of the rods 32 by the loops 36 is a slat or sheet metal plate 37, upon the face 38 of which the words "This is" are printed. This slat or sheet metal plate is designed to be lowered in registration with the upper portion of the opening 6, so that these words may appear when the conveyance arrives at the station or the place or business house. When the rod 28 is rotated, the arms 30 assume horizontal positions, thus allowing the rods 32 to drop in the positions shown in dotted lines in Fig. 2, so that the slat or sheet metal plate 37 may assume a position in front of the slat or sheet metal plate 40, which is permanently, or stationarily or otherwise fixed in registration with the upper portion of the opening 6. Upon the face 41 of the slat 40 the words "The next station is" are printed, and when the slat or plate 37 is lowered, these words are hidden, and in their stead the words "This is" appear.

Upon the end 42 of the rod 28, a collar 43 is frictionally fixed. This collar 43 is provided with four radially extending arms 44, which, when the rod 28 is at rest, are disposed at opposite inclinations of forty-five degrees, each at right angles to the other. These arms 26 and 44 are to be engaged by the latch dogs 46 and 47, which are pivotally carried by the draw bar 48, so as to rotate the shaft 20 and rod 28 simultaneously. The latch dogs 46 and 47 are prevented from downward movement by contacting with the lower portions 49 and 50 of the openings 51 and 52, in which the dogs 46 and 47 are pivoted. However, the openings 51 and 52 are cut away in such a manner, as shown at 53 and 54, to receive the free ends of the latch dogs, when they are moved upon their pivots, in an upward direction. First one and then the other of the dogs 47 and 47$^a$ may be thrown out of operative position, it depending whether the chain of slats is moving from the top toward the front of the casing, or from the top toward the back of the casing. If the chain of slats is being moved from the top toward the front, the latch dog 47$^a$ is thrown out of operative position, but if the slats are moving in the reverse direction, the latch dog 47 is thrown out of operative position. These dogs are thrown out of position, when desired, by the three-armed plate 57, pivoted at 58. The depending arm 59 of this plate is provided with a laterally extending lug 60, which is engaged by the forks 61 on the rack bar 62, which is guided in the groove 63 of the bracket plate 64, which forms a part of the division plate 10.

Mounted in suitable bearings 65 of one end of the casing and one of the division plates 10 is a shaft 66, terminating at one end in a crank 67 having a handle 68. Fixed to rotate with the shaft 66 is a gear 69, which meshes with the teeth 70 of the rack. When the shaft 66 is rotated, the rack 62 is reciprocated in its guide, and, by virtue of the lug and fork connection between the rack and the depending arm 59, the plate 57 is oscillated upon its pivot 58, thus throwing one or the other of the latch dogs 47 and 47$^a$ out of operative position.

The draw bar 48 is formed with a rectangular reduced portion 71, which is guided in an opening 72 of the bracket plate 64, and a cylindrical extension 73 of the portion 71 is guided in an opening 74 of the bracket plate 75. A pin 76 extends transversely of the portion 71, and is designed to contact with the under surface of the bracket plate 64, thus limiting the draw bar in its upward movement. When the draw bar is raised vertically, however, the same is returned to its normal position by the spring 77, which surrounds the extension 73 and is interposed between the bracket plate 75 and the collar 78 which is secured upon the lower end of the extension 73 by a screw 78$^a$. Upon every upward vertical movement of the draw bar, the rod 28 is rotated, but the shaft 20 is only rotated upon every other upward movement of the draw bar. This action of the shaft 20 is accomplished by throwing the operative latch dog into an inoperative position, upon every other upward movement of the bar. The throwing of the latch dog into inoperative position is accomplished by virtue of the radial arms 79 of the collar 80, which is fixed to the shaft 81 which is mounted in the bearing 82 of the brackets 83. The arms 79, when the shaft 81 is at rest, are disposed at opposite inclinations of forty-five degrees and at right angles to each other.

Fixed to or forming a part of the shaft 81 and arranged centrally thereof is a rectangular enlargement 84, the faces of which are engaged by the free end of a spring arm 85 secured at 86 to the draw bar. When the shaft 81 is at rest, two of the diagonally opposite corners of the rectangular enlargement 84 assume positions in vertical alinement, and the blades 87 of the shaft 81 also assume vertical positions when the shaft 81 is at rest. These blades 87 are designed for the purpose of engaging one or the other of the tails 88 of the dogs 47, so as to oscillate the operative dog 47, in order to throw the nose thereof momentarily from the path of one of the arms 26 of the collar 25, upon every other movement of the draw bar. To operate the shaft 81, a latch dog 90 pivoted in a bracket 91 secured to the casing, as at 92, is provided. This dog, upon downward movement of the draw bar, contacts with one of the arms 79, thus rotating the shaft 81, so as to throw one or the other of the blades 87 in engagement with the tail 88 of the operative dog 47, which will momentarily throw its nose from the path of one of the arms 26. However, on the upward movement of the draw bar, the dog 90 oscillates idly.

The upper end of the draw bar is provided with an L-shaped aperture 93, through which one end of a cord, cable or rope 94 is extended, the end of which is formed with a knot 95, to prevent the cord, cable or rope from disengagement from the draw bar. This cable, rope or cord passes over a pulley 96 and is extended to any location whatsover in the conveyance, to be pulled by any suitable contrivance (not shown), either by the conductor or the motorman. It may be operated by foot or hand power.

The ends 98 and 99 of the shaft 20 and the rod 28 are provided with rectangular blocks 100 and 101, which are held thereon by friction or other suitable means. The division plate 10 at the left of the indicator, reference being had to Fig. 2, is provided with a bracket plate 102, in which, by means of a set screw 103, a spring 104 is fixed. The opposite free ends of the spring 104 bear respectively upon the faces of the blocks 100 and 101, in order to insure the shaft 20 and rod 28 against movement, when at rest.

Extending laterally of the division plate 10, to the left in Fig. 2, is an extension 105 having an overhanging arm 106. Journaled in bearings of the overhanging arm 106 and the extension 105 is a pin 107, about which a coil spring 108 is arranged. Pivoted on the pin 107 is a gong striking arm 109. The spring 108 is arranged in such wise with relation to the arm 106 and the arm 109 as to be put under tension, when the arm 109 is oscillated, by the radial arms 110 of the collar 111 secured on the extension of the rod 28, by means of the set screw 112. Secured to the lug 114 of the division plate 10 to the left of the indicator in Fig. 2 is a wire gong 115, which is struck by the arm 109, after the same has been oscillated by one of the arms 110 of the collar 111, thus notifying a passenger by sound of the arrival at a station or place, while the name of the station is displayed through the opening 6 of the indicator. A pair of rods 116 secured in sockets 117 in the bottom of the casing holds the two piles of slats of the plurality of slats separated and prevents them from becoming jostled together, as one increases in size while the other diminishes.

Upon leaving one station, thereby approaching the next, for instance "La Grange" or the like, a pulling action is imparted on the cord, cable or rope 94, thereby raising the draw bar, and if the chain of slats is being moved from the top to the front of the casing, the reel or roller 21 is rotated by the coöperation of the dog 47 and the arms 26 of the collar 25, and, at the same time, the rod 28 is rotated, by the coaction of the dog 46 and one of the arms 44 of the collar 43. In this way the reel is moved so as to dispose only one slat, upon which the word "La Grange" appears through the opening 6. At the same time, the slat or sheet metal plate 37 is raised from in front of the slat or sheet metal plate 40, thereby permitting the words "The next station is", which is printed on the slat 40, to appear. When the conveyance reaches the station "La Grange", another pulling action is imparted on the cable or cord 94, thereby elevating the draw bar. However, this time the dog 47 is thrown into an inoperative position, thereby permitting the reel to remain as it is, but when the draw bar is raised this time, the rod 28 is rotated, which will dispose the arms 30 horizontally, thereby dropping the slat 37 in front of the stationary slat 40, thus obscuring from view the words "The next station is", and displaying instead the words "This is". At each time these signals are displayed, the alarm or sound is given by the gong, thus not only by a printed display but also an alarm, the approach and the arrival at a station, place, business house, theater or any other location is indicated to the various passengers.

From the foregoing, it will be observed that there has been devised a very efficient, novel, practical and desirable place indicator, and one which has not only been found practical from use thereof, but also complete in the minutest detail.

The invention having been set forth, what is claimed as new and useful is:—

1. In a place indicator, a casing having an opening in the front thereof, means for displaying permanently certain words, means for displaying certain other words in front of the first words as a place is reached, and a reel journaled in the casing having a chain of slats operable thereby, and means for operating the reel every other time the second means is operated.

2. In a place indicator, a casing having an opening, means for permanently displaying certain words, a device for displaying certain other words in front of the first words as a place is reached, a reel journaled in the casing having a chain of slats operable thereby, and means for operating the reel every other time the device is operated, and means for operating the device.

3. In a place indicator, a casing having an opening, means for permanently displaying certain words, a device for displaying certain other words in front of the first words as a place is reached, a reel journaled in the casing having a chain of slats operable thereby adapted to be operated every other time the device is operated, and mechanism for operating the device, and connections between the mechanism and the reel, whereby the reel is operated every other time the device is operated.

4. In a place indicator, a casing having an opening with a permanent sign display in one portion thereof, a movable device having a member and adapted to dispose another sign display in front of the first sign display, a reel, a shaft therefor having radial arms, a chain of slats operated by the reel, a mechanism for operating the movable device and the reel, said mechanism including latch dogs to coact with the radial arms of the reel shaft and the member of the movable device, and means to throw one of the dogs to an inoperative position, every other time the movable device is operated, whereby the reel may not be moved.

5. In a place indicator, a casing having an opening, a reel journaled in bearings of the casing and in rear of the lower portion of the opening, a chain of display slats operable by the reel to display the name of various stations, a permanent display means arranged in the rear of the opening, movable hangers having a display slat, movable to and from behind the opening, a revoluble shaft including arms to operate the hangers arranged at one end thereof, the reel shaft having radial arms at one end, and a mechanism including a draw bar having dogs adapted to engage the arms of the revoluble shaft and additional dogs to engage the arms of the reel shaft, whereby the revoluble shaft may be actuated every time the draw bar is moved, and means for throwing the additional dog to inoperative position every other time the bar is actuated, so that the reel shaft may not be rotated.

6. In a place indicator, a casing having an opening, a reel journaled in bearings of the casing and in rear of the lower portion of the opening, a chain of display slats operable by the reel to display the name of various stations, a permanent display means arranged in the rear of the opening, movable hangers having a display slat, movable to and from behind the opening, a revoluble shaft including arms to operate the hangers arranged at one end thereof, the reel shaft having radial arms at one end, and a mechanism including a draw bar having dogs adapted to engage the arms of the revoluble shaft and additional dogs to engage the arms of the reel shaft, whereby the revoluble shaft may be actuated every time the draw bar is moved, means for throwing the additional dog to inoperative position every other time the bar is actuated, so that the reel shaft may not be rotated, and means engageable simultaneously with the revoluble shaft and the reel shaft to prevent them from displacement while at rest.

7. In a place indicator, a casing having an opening, means for permanently displaying certain words, a device for displaying certain other words in front of the first words as a place is reached, a reel journaled in the casing having a chain of slats operable thereby adapted to be operated every other time the device is operated, and mechanism for operating the device, connections between the mechanism and the reel, whereby the reel is operated every other time the device is operated, the mechanism including a shaft having means to actuate the device, and an alarm adapted to be actuated by the shaft of the mechanism.

8. In a place indicator, a casing having an opening with a permanent sign display in one portion thereof, a movable device having a member with another sign display thereon adapted to cover the permanent sign, a reel, a chain of slats operated by the reel, and means adapted when first operated to operate the reel and the device simultaneously to dispose a different slat in the opening and to remove the member from in front of the permanent sign display, and when again operated to actuate only the movable device to restore the member thereof in front of the permanent sign display.

9. In a place indicator, a casing having an opening with a permanent sign display in one portion thereof, a movable device having a member with another sign display thereon adapted to cover the permanent sign, a reel, a chain of slats operated by the reel, and means adapted when first operated to operate the reel and the device simultaneously to dispose a different slat in the opening and to remove the member from in front of the permanent sign display, and when again operated to actuate only the movable device to restore the member thereof in front of the permanent sign display, said means including two pawls adapted respectively to operate the reel in opposite directions, and means including an oscillatory member for shifting either of the pawls to an inoperative position, so that the chain of slats may be reversed in its movement.

10. In a place indicator, a casing having an opening with a permanent sign display in one portion thereof, a movable article having a member with another sign display thereon adapted to cover the permanent sign, a reel, a chain of slats operated thereby; means including devices to operate the reel in opposite directions and an element, one of the devices adapted on first operating the means to operate the reel, while the element operates the movable article simultaneously with the reel to dispose a different slat in the opening and to remove the member from in front of the permanent sign display; means in the path of one of the devices to temporarily throw the same to an inoperative position for preventing the same from operating the reel, when again operating the first means; while the element operates the movable article to restore the member of the movable article in front of the permanent sign display; and a mechanism for changing one of the devices to an operative position and the other device to an inoperative position, whereby as the first means is operated the chain of slats may be reversed in its movement.

In testimony whereof I have signed my name to this specification in the presence of two subscribing witnesses.

ABNER SMITH INGMAN.

Witnesses:
BAMA E. CLAY,
WM. V. ACCOLA.

---

Copies of this patent may be obtained for five cents each, by addressing the "Commissioner of Patents, Washington, D. C."